(12) United States Patent
Kiefer et al.

(10) Patent No.: US 6,206,439 B1
(45) Date of Patent: Mar. 27, 2001

(54) PROTECTIVE BUMPER FOR A TRANSPORT REFRIGERATION UNIT

(75) Inventors: David D. Kiefer, Watkinsville; Michael E. Davis, Bogart, both of GA (US); Douglas E. Moore, El Cajon, CA (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/282,678

(22) Filed: Mar. 31, 1999

(51) Int. Cl.$^7$ ................................................ B60R 19/03
(52) U.S. Cl. ...................... 293/121; 293/102; 293/154; 296/180.4
(58) Field of Search ..................... 293/121, 102, 293/115, 149, 151, 152, 154, 126, 120, 128; 296/180.4

(56) References Cited

U.S. PATENT DOCUMENTS

| | | | |
|---|---|---|---|
| 4,055,362 | * 10/1977 | Becker, III | 293/121 |
| 4,111,478 | * 9/1978 | Pompei et al. | 293/154 |
| 4,299,418 | * 11/1981 | Dossin | 293/154 |
| 4,310,192 | * 1/1982 | Fitzgerald | 296/180.4 |
| 4,364,591 | * 12/1982 | Bien | 293/102 |
| 4,546,021 | * 10/1985 | Mears | 293/102 |
| 4,551,986 | * 11/1985 | Anderson et al. | 62/239 |
| 4,596,412 | * 6/1986 | Everett et al. | 293/149 |
| 4,783,104 | * 11/1988 | Watanabe et al. | 293/154 |
| 5,031,947 | * 7/1991 | Chen | 293/121 |
| 5,137,313 | * 8/1992 | Teig | 293/102 |
| 5,711,073 | * 1/1998 | Tippmann et al. | 29/897.2 |
| 6,042,162 | * 3/2000 | Kiefer et al. | 293/117 |

* cited by examiner

*Primary Examiner*—Joseph D. Pape
*Assistant Examiner*—Kiran Patel

(57) ABSTRACT

Auxiliary structural bumpers are adapted to be attached to a main protective bumper assembly for a refrigeration unit of the type adapted to be mounted on the front wall of a trailer. The main protective bumper protects the front of the unit while the auxiliary bumpers are adapted to protect the left and right-hand sides of the refrigeration unit. The refrigeration unit includes an outer cover, and a structural framework, which includes a pair of vertically extending structural elements located at opposite rear corners of the refrigeration unit adjacent to the front wall of the trailer. The main bumper assembly includes two vertically extending structural members, each of which is adapted to be structurally coupled to one of the vertically extending structural elements of the refrigeration unit. A pair of horizontally extending structural members are attached to the upper ends of the vertically extending members at one end thereof and the other ends extend forwardly towards the front of the refrigeration unit. The ends of the horizontally extending structural members, which extend forwardly, terminate at a location forward of the outer cover and spaced from one another. An elongated structural bumper extends substantially horizontally at a location forwardly of the outer cover where it is attached to the other ends of the horizontally extending structural members. Auxiliary structural bumpers are adapted to be positioned to one side of the main structural bumper and outboard of one side of the outer cover of the refrigeration unit. The auxiliary bumpers extend substantially horizontally and are structurally attached at one end thereof to one end of one of the horizontally extending structural members and at the other end thereof to the main elongated structural bumper.

4 Claims, 4 Drawing Sheets

PROTECTIVE BUMPER FOR A TRANSPORT REFRIGERATION UNIT

BACKGROUND OF THE INVENTION

1. Field of the Invention

The invention relates to a protective bumper assembly for a refrigeration unit of the type adapted to be mounted on the front wall of a trailer. More specifically, it relates to such a bumper assembly which protects both the front and sides of such a refrigeration unit and which transmits force from the bumper to the front wall of the trailer.

2. Description of the Prior Art

Refrigeration units adapted to be mounted to the front end of the trailer of a tractor trailer vehicle for controlling the temperature within the trailer are well known in the art. It is common practice for such refrigerated trailers to be stored in a rail yard, or the like, without the tractor unit attached thereto. It is also common practice for such refrigerated trailers to be shipped by rail without the trailers attached thereto. During such storage or transportation of the trailer without the tractor attached, the refrigeration unit is subject to damage as a result of impact with other trailers and the refrigeration units of other trailers.

Various protective bumpers and bumper systems have been used with such units for the purpose of attempting to prevent or minimize damage to the refrigeration units. Known bumper systems have either been not robust enough to prevent damage or they transmitted the force of the collision into the frame of the refrigeration unit, thus, causing the frame to distort and causing internal unit damage.

A U.S. patent application entitled "Protective Bumper For A Transport Refrigeration Unit" filed on Feb. 20, 1998, as U.S. Ser. No. 09/027,386 and assigned to the Assignee of the present invention discloses a protective bumper assembly for a refrigeration unit of this type, which will protect the unit without the possibility of causing damage to the internal framework of the unit. The protective bumper assembly disclosed in this patent application is relatively inexpensive and can protect both the top and bottom of the refrigeration unit.

It has been found that the protective bumpers disclosed in the above-referenced patent application perform very well in protecting refrigeration units under the circumstances set forth above, but that they required additional protection in the corners of the unit. Such additional protection would protect the microprocessor and other components located on the left or right front sides of the covers of such units from damage when one trailer backed into another and the pointed rear corner of the trailer impacted a very narrow area in the corner of the unit, which the main bumpers did not protect.

SUMMARY OF THE INVENTION

Auxiliary structural bumpers are adapted to be attached to a main protective bumper assembly for a refrigeration unit of the type adapted to be mounted on the front wall of a trailer. The main protective bumper protects the front of the unit while the auxiliary bumpers are adapted to protect the left and right-hand sides of the refrigeration unit.

In the preferred embodiment, the refrigeration unit includes an outer cover, and a structural framework, which includes a pair of vertically extending structural elements located at opposite rear corners of the refrigeration unit adjacent to the front wall of the trailer. The main bumper assembly includes two vertically extending structural members, each of which is adapted to be structurally coupled to one of the vertically extending structural elements of the refrigeration unit. A portion of the vertically extending structural member extends above the outer cover of the unit. A pair of horizontally extending structural members, also located outside the outer cover of the refrigeration unit, are attached to the ends of the vertically extending members at one end thereof and the other ends extend forwardly towards the front of the refrigeration unit. The ends of the horizontally extending structural members, which extend forwardly, terminate at a location forward of the outer cover and spaced from one another. An elongated structural bumper extends substantially horizontally at a location forwardly of the outer cover where it is attached to the other ends of the horizontally extending structural members. Auxiliary structural bumpers are adapted to be positioned to one side of the main structural bumper and outboard of one side of the outer cover of the refrigeration unit. The auxiliary bumpers extend substantially horizontally and are structurally attached at one end thereof to one end of one of the horizontally extending structural members and at the other end thereof to the main elongated structural bumper.

BRIEF DESCRIPTION OF THE DRAWINGS

The invention may be better understood and its objects and advantages will become apparent to those skilled in the art by reference to the accompanying drawings, in which.

DESCRIPTION OF THE PREFERRED EMBODIMENT

Figure 1:
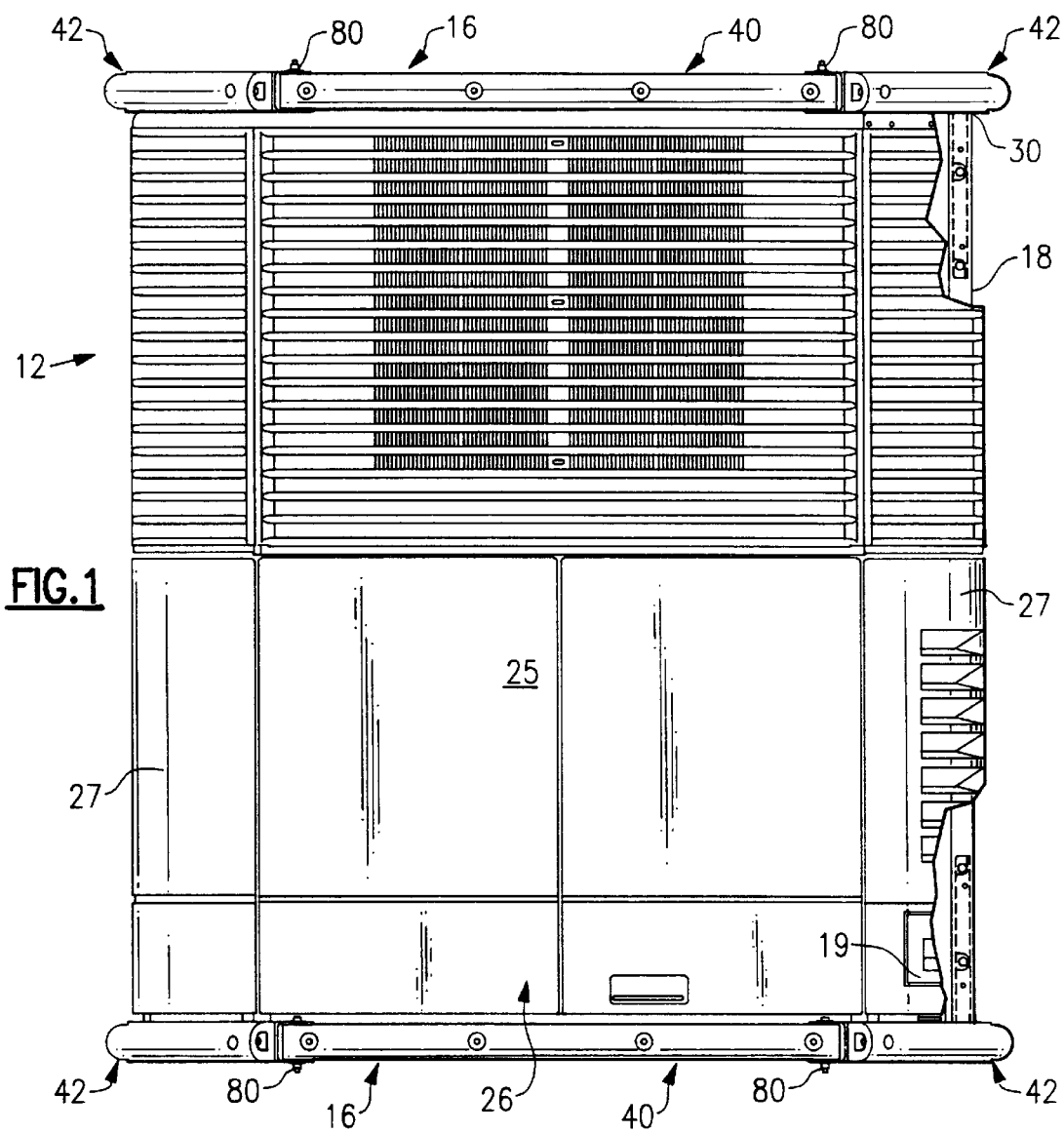
FIG. 1 is an elevation view of a refrigeration unit of the type adapted to be mounted to the front end of a trailer, which includes a protective bumper assembly according to the present invention.

FIG. 1 is a front view of a transport refrigeration unit 12, which is adapted to be installed on the front wall 14 of a large transport trailer unit (as shown schematically in FIG. 7), as is well known in the prior art. The refrigeration unit 12 is of the type known in the art and comprises generally a one-piece, self contained refrigeration/heating unit powered by a diesel engine. An internal structural framework supports all of the components within the refrigeration unit and facilitates attachment of the unit to the trailer front wall. Protective bumper assemblies, including auxiliary bumpers according to the present invention, are shown installed at both the top and bottom of the refrigeration unit 12. The main protective bumpers assemblies illustrated in FIGS. 1 and 2 form the subject matter of U.S. patent application Ser. No. 09/027,386 entitled "Protective Bumper For a Transport Refrigeration Unit" filed on Feb. 20, 1998, and assigned to the Assignee of the present invention. The disclosure of this prior filed application is hereby incorporated by reference herein in its entirety.

Figure 2:
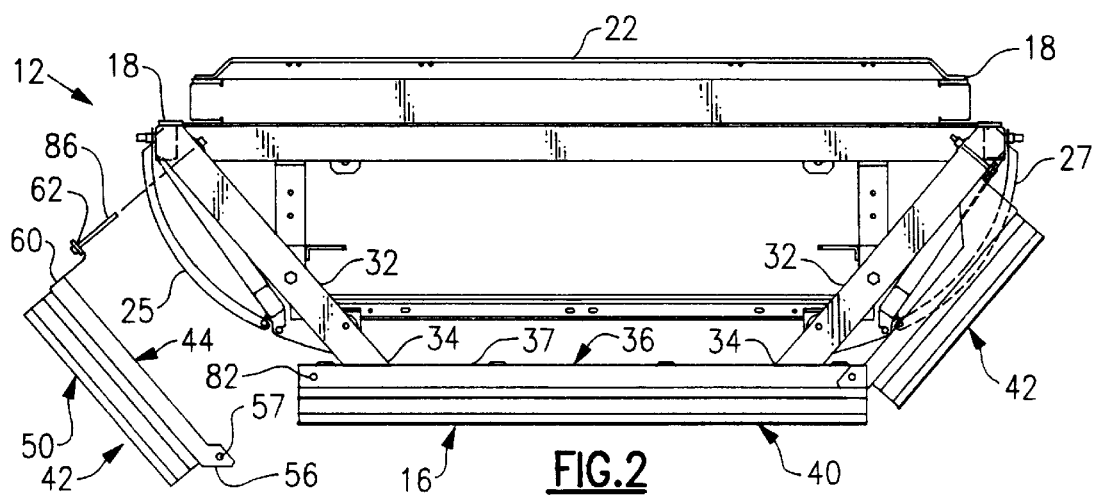
FIG. 2 is a top view of the refrigeration unit illustrated in FIG. 1 with one of the auxiliary bumpers removed therefrom.
Figure 3:
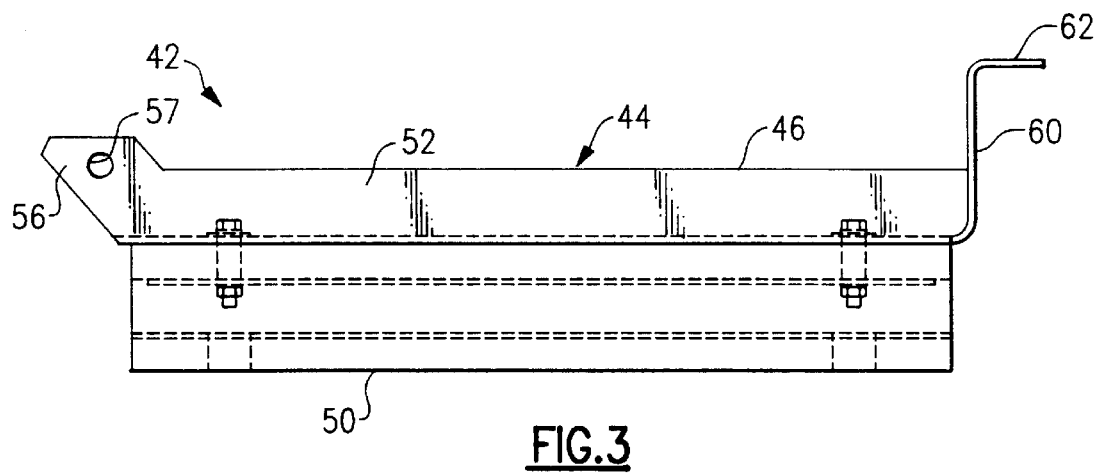
FIG. 3 is a top view of an auxiliary protective bumper of the type illustrated in FIGS. 1 and 2.
Figure 4:
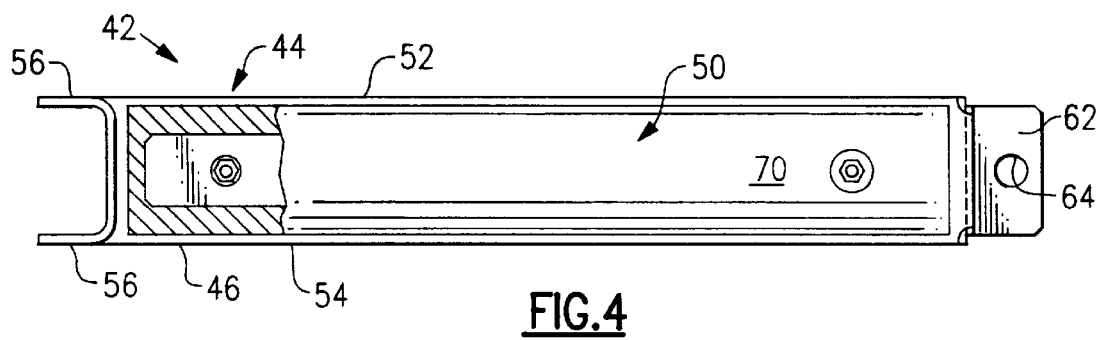
FIG. 4 is a front view of the auxiliary protective bumper illustrated in FIG. 3.
Figure 5:
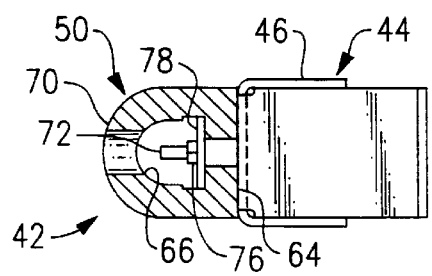
FIG. 5 is a right-end view of the auxiliary bumper illustrated in FIGS. 3 and 4.
Figure 6:
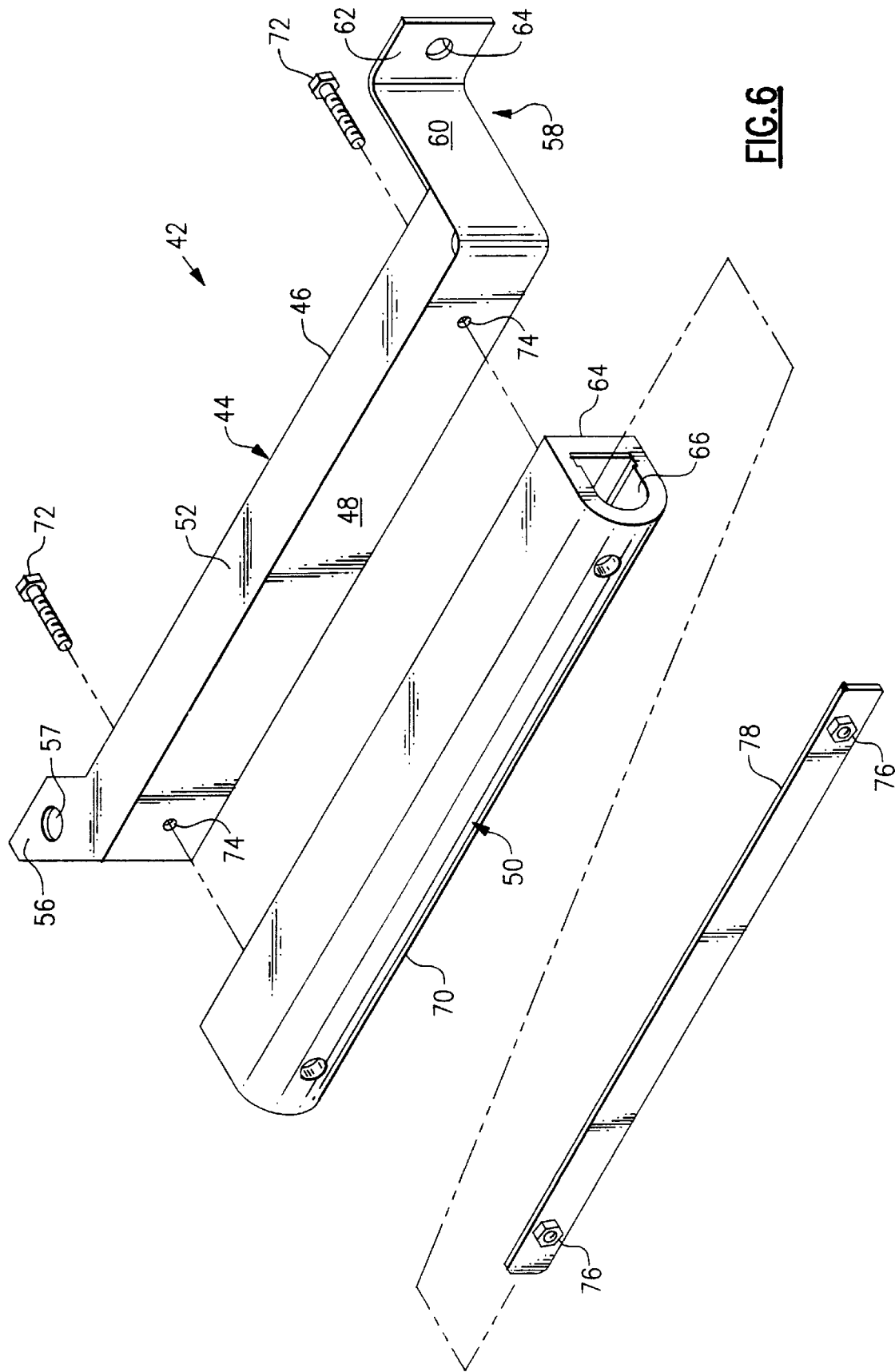
FIG. 6 is an enlarged, exploded perspective view of the auxiliary bumper illustrated in FIGS. 3 through 5.
Figure 7:
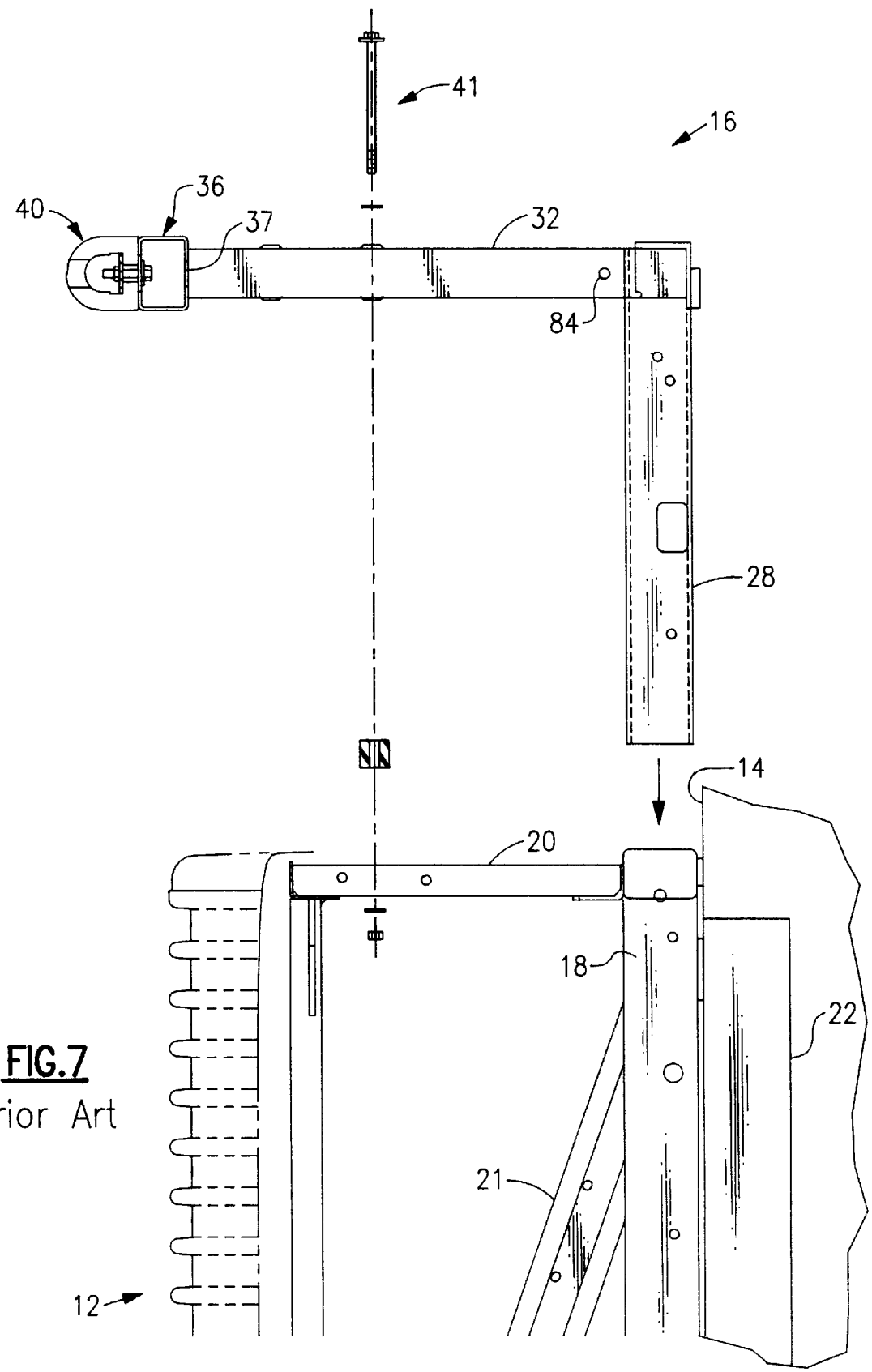
FIG. 7 is an enlarged view of the top of a refrigeration unit and main bumper assembly of the prior art.

With reference to FIGS. 2 and 7, the structural framework of the transport refrigeration unit 12 and the attachment thereto of the main bumper assembly 16, according to the prior art, will be described so that the interaction with these components with the auxiliary bumpers of the present invention will be fully appreciated.

The structural framework of the unit 12 includes a pair of vertically extending rear frame posts 18 located at the opposite rear corners of the unit 12 and a pair of horizontally extending structural members 20 attached to the upper ends of the rear frame posts 18. The posts 18 are tubular members having a hollow rectangular cross section. Other structural elements, such as the diagonal 21 illustrated in FIG. 7, cooperate to make up the framework and to support all of the internal components of the refrigeration system and facilitate attachment of the unit to the trailer front wall. Specifically, the portion 22 of the refrigeration unit 12 which houses the evaporator section of the refrigeration unit is designed to fit into a rectangular opening in the upper portion of the trailer front wall. When so installed, the rear surfaces 24 of the rear frame posts 18 are in confronting relationship with the front wall of the trailer. Attachment of the refrigeration unit 12 to the trailer is then accomplished by passing suitable threaded fastening means through the rear frame post 18 through the front wall of the trailer, and into engagement with suitable structural provided in the trailer front wall.

Also supported by the structural framework is an outer cover 26, which includes the necessary air inlet and outlet openings for cooling, and which may be opened to provide access to the interior of the unit for maintenance and service. The outer cover includes a large curved front portion 25 and arcuately shaped side portions 27. The lower end 23 of the right-hand arcuate cover section 27 is adapted to cover a microprocessor controller 19 for the unit. The microprocessor controller 19 is a particularly vulnerable portion of the unit and, as will be seen, is protected by the auxiliary bumpers of the present invention.

With reference to FIGS. 1 and 2, it will be noted that the top and bottom of the refrigeration unit 12 do not have an outer cover thereover and, therefore, are open. As a result, the top and bottom of the rear frame posts 18 are readily accessible from the top and bottom of the refrigeration unit, thus facilitating the structural interconnection of the main bumper assembly 16 to the unit by sliding engagement of vertically extending mounting channels 28 into the rear frame posts 18.

Looking now at the bumper assembly 16 in detail, a pair of vertical bumper mounting channels 28, referred to above, are sized so as to be received within the rear frame posts 18. Attached to each of the vertical bumper channels 28 at their upper ends 30 are a pair of diagonally extending support tubes 32.

As best seen in FIGS. 2 and 7, the diagonal support tubes 32 extend from their attachment, preferably a welded connection, angularly away from the rear frame post 18. The outer ends 34 of the diagonal support tubes 32 are connected through welded connections to a horizontally extending tubular bumper support channel 36. The bumper support channel 36 is rectangular in cross-section and the diagonal support tubes 32 are attached to the rear wall 37 thereof. As best seen in FIG. 7, an elongated rubber bumper 40 is attached to the front wall 38 of the bumper support channel 36. With continued reference to FIGS. 2 and 7, installation of the main bumper assembly 16 to the refrigeration unit 12 is accomplished by inserting the two vertical bumper channels 28 into the rear frame posts 18 of the refrigeration unit. Once installed, suitable mounting hardware interconnects the rear frame posts 18, the vertical bumper channels 28 and the front wall support structure of the trailer to which the unit is attached. Such attachment provides a direct load bearing path from the bumper 40, through the bumper support channel 36, through the diagonal supports 32 to the vertical bumper channels 28. The channels 28 in turn transfer the load directly to the rear frame posts 18 and the structural elements of the front wall of the trailer 10.

As best shown in FIG. 7, additional mounting hardware, generally, 41, interconnects the diagonal support tubes 32 and the horizontal channel 20. Such connections 41 are intended to restrain the bumper assembly 16 from undesired vertical or horizontal motion with respect to the refrigeration unit and are not intended to absorb any force imparted upon the bumper assembly by impact with another object.

As best seen in FIGS. 1 and 2, the bumper support channel 36 and a rubber bumper 40 of the main bumper assembly 16 extend substantially coextensively with the front section 25 of the outer cover 26 of the refrigeration unit 12. These figures also illustrate main bumper assembly 16 being installed on both the upper and lower ends of the refrigeration unit 12. Mounted outboard from each end of the main bumper assemblies 16 at both the top and bottom thereof are four auxiliary bumper assemblies 42 according to the present invention. As will be appreciated, the installation of these auxiliary bumper assemblies extend protection of the refrigeration unit to both of the arcuate side sections 27 of the front cover 26. Each of the auxiliary bumper units 42 includes a main structural channel 44, which is configured such that it may be mounted on the left or right-hand or upper or lower sides of the refrigeration unit. The channel 44 comprises an elongated central U-shaped section 46, which defines a front planar surface 48 to which an elongated rubber bumper structure 50 is attached.

FIGS. 3 through 6 illustrate an auxiliary bumper unit 42 oriented in a manner such that it is adapted to be attached to the right-hand side of a refrigeration unit 12, as illustrated in FIG. 1. The unit 42 will be described in this orientation using top and bottom and left and right-hand orientations for purposes of convenience of description only, it being understood that the unit may be reversed for installation on the other side of the unit and such conventions would be reversed.

The U-shaped channel 46 defines an upper surface 52 and a lower surface 54. Extending to the left and rearwardly from the left-hand ends of both of the upper and lower surfaces 52 and 54 are planar attachment surfaces 56. The surfaces 56 are parallel to and spaced from one another by a distance slightly greater than the thickness of the horizontal bumper channel 36 of the main bumper assembly 16 so that they will extend above and below the end of the channel 36 to facilitate attachment of the auxiliary bumper unit 42 thereto. Such attachment will be described in more detail herein below. Extending from the right-hand end of the channel 44 is a dog leg attachment structure 58, which includes a first planar section 60 extending rearwardly from the end of the channel and a perpendicularly oriented end section 62 having a central opening 64 therethrough to facilitate attachment thereof to the main bumper assembly 16.

With continued reference to FIGS. 3 through 6, the bumper 50 has a substantially D-shaped cross-section and defines a D-shaped interior chamber 66 therein. The rear wall 68 of the bumper 50 is adapted to be in mating relationship with the front wall 48 of the bumper channel. A forwardly facing curved section 70 defines the protective outer surface of the bumper. In the illustrated embodiment, the bumper 50 is attached to the channel 44 by a pair of threaded connectors 72, which pass through the open back of the U-shaped section 46 through suitable mating openings 74 therein and into threaded nuts 76 provided on a bumper attaching strip 78, which is located within the D-shaped chamber 66.

Attachment of the auxiliary bumper unit 42 to the main bumper assemblies 16 is simply accomplished by orienting the unit with the above described attachment structure in mating relationship with attachment openings provided in the main bumper assembly 16. Specifically, the attachment surfaces 56 and the openings 57 therein are aligned with the mating opening 82 provided in the end of the front bumper structural channel 36. Suitable threaded nut and bolt fasteners 80 are then passed therethrough and engaged as illustrated in each of the auxiliary bumpers as shown in FIG. 1. At the same time, the end section 62 of the dog leg 58 is positioned with the opening 64 therein in axial alignment with a mating opening 84 provided in one of the diagonal support tubes 32 and an appropriate threaded fastener and nut assembly 86, as best shown in FIG. 2, completes the assembly thereto.

It will be appreciated that an auxiliary bumper unit 42 may be installed in one, two, three or four of the positions illustrated in FIG. 1, depending upon the application and the protection desired for the particular unit. It is will be further appreciated that because the auxiliary bumper units 42 are structurally attached directly to the structural elements of the main bumper assembly 16 that any forces imparted upon the auxiliary bumper assemblies 42 will be passed through the structure of the main bumper assembly 16 to the rear vertical posts 18 and, accordingly, to the structure of the trailer unit, thus precluding any distorting or damaging forces being transmitted to the actual structure of the refrigeration unit.

It should be appreciated that the auxiliary bumper assemblies 42 are attached to the main bumper assembly 16, which in turn are attached to the refrigeration unit 12 and front wall of the trailer without requiring any modifications to the refrigeration unit or the trailer structure. Further, the auxiliary bumper units 42 may be readily removed from the main bumper assembly 16 and replaced easily in the field should the units be damaged beyond repair.

What is claimed is:

1. A protective bumper assembly for a refrigeration unit of the type adapted to be mounted on the front wall of a trailer, the refrigeration unit having an outer cover and a structural framework including at least two vertically extending structural elements located at the rear of the refrigeration unit adjacent the wall of the trailer, the protective bumper assembly being of the type which includes, two or more horizontally extending structural members, each of which is configured to be structurally coupled at one end thereof to a different one of the vertically extending structural elements of the refrigeration unit's structural framework, and including a structural bumper positioned forwardly of the outer cover of the refrigeration unit, the structural bumper extending substantially horizontally and being structurally coupled at different locations therealong to the other end of each of the horizontally extending structural members, wherein the improvement comprises:

an auxiliary structural bumper positioned to one side of the structural bumper, and positioned outboard of one side of the outer cover of the refrigeration unit, said auxiliary bumper extending substantially horizontally and being structurally coupled at one end thereof to said one end of one of the two or more horizontally extending structural members, and at the other end thereof to the structural bumper;

whereby forces imparted to the structural bumper or to the auxiliary bumper will be transferred to the vertically extending structural elements of the refrigeration unit.

2. The apparatus of claim 1 wherein the outer cover of said refrigeration unit defines a substantially rectangular front profile having four corners thereof and wherein a first protective bumper assembly is located above the outer cover, and a second protective bumper assembly is located under the refrigeration unit cover, and wherein each of said protective bumper assemblies has an auxiliary bumper attached thereto adjacent each of the four corners of said outer corner.

3. The apparatus of claim 1 wherein said auxiliary structural bumper comprises a structural steel channel having a front face, and an elastomeric protective element configured to be attached to said front face.

4. The apparatus of claim 3 wherein said structural steel channel has integrally formed therewith, structural attachment means at one end thereof configured to be structurally attached to said horizontally extending structural member, and a second structural attachment means at the other end thereof, which is configured to be structurally attached to said structural bumper.

* * * * *